US007305891B2

(12) United States Patent
Walls

(10) Patent No.: US 7,305,891 B2
(45) Date of Patent: Dec. 11, 2007

(54) DETECTABLE INDICATOR

(75) Inventor: Raul Aquirre Walls, Columbus, IN (US)

(73) Assignee: Valeo Sylvania LLC, Seymour, IN (US)

( * ) Notice: Subject to any disclaimer, the term of this patent is extended or adjusted under 35 U.S.C. 154(b) by 73 days.

(21) Appl. No.: 11/342,917

(22) Filed: Jan. 30, 2006

(65) Prior Publication Data

US 2007/0186676 A1 Aug. 16, 2007

(51) Int. Cl.
*G01N 3/20* (2006.01)

(52) U.S. Cl. ........................................................ 73/849

(58) Field of Classification Search ................... 73/849
See application file for complete search history.

(56) References Cited

U.S. PATENT DOCUMENTS 2,512,932 A * 6/1950 Gretschel .................... 337/262
3,843,971 A * 10/1974 Delanty et al. ................ 2/114
4,148,140 A * 4/1979 Lile ............................ 30/161
4,344,060 A * 8/1982 Ciesemier et al. .......... 337/260
4,392,732 A * 7/1983 Pizzuti ....................... 396/350
4,953,695 A * 9/1990 Tallman ......................... 206/5
5,069,568 A * 12/1991 Acker .......................... 402/73
5,492,020 A * 2/1996 Okada ................... 73/862.626
5,769,276 A * 6/1998 Alexander .................. 222/148
6,259,794 B1 * 7/2001 Dobbins ..................... 381/124
6,357,797 B1 * 3/2002 Lee ............................. 281/42
2001/0018925 A1 * 9/2001 Moore ........................ 137/219

* cited by examiner

*Primary Examiner*—Max Noori
(74) *Attorney, Agent, or Firm*—William E. Meyer

(57) ABSTRACT

A detectable indicator (10) formed on a body (18), the indicator (10) comprising a deformable element (12), a safeguard (14) at least partially surrounding the deformable element (12) and an area (16) in the safeguard allowing access to the deformable element (12).

5 Claims, 2 Drawing Sheets

DETECTABLE INDICATOR

TECHNICAL FIELD

This invention relates to indicators and more particularly to a protected indicator that provides knowledge of the applicability of a part for further processing.

BACKGROUND ART

It is often necessary during the manufacture of articles to make certain that a particular part is available or properly located or positioned. To achieve this result, pieces have been marked with a prick mark, infrared labels, ink jet labels, etc. All of these prior techniques involved added parts and costs or suffered from an inability to consistently detect the infrared labels or ink jet labels.

It would be an advance in the art if a simple and effective locator could be provided.

DISCLOSURE OF INVENTION

It is, therefore, an object of the invention to obviate the disadvantages of the prior art.

It is another object of the invention to enhance the manufacturability of parts.

Still another object to the invention is the provision of a detectable locator that is protected during pre-assembly operations.

These objects are accomplished, in one aspect of the invention, by a detectable indicator that comprises a deformable element; a safeguard at least partially surrounding the deformable element; and an area in the safeguard allowing access to the deformable element.

The indicator so provided is protected during all former operations and is then deformed to indicate its availability for a subsequent operation.

BEST MODE FOR CARRYING OUT THE INVENTION

For a better understanding of the present invention, together with other and further objects, advantages and capabilities thereof, reference is made to the following disclosure and appended claims taken in conjunction with the above-described drawings.

Figure 1:
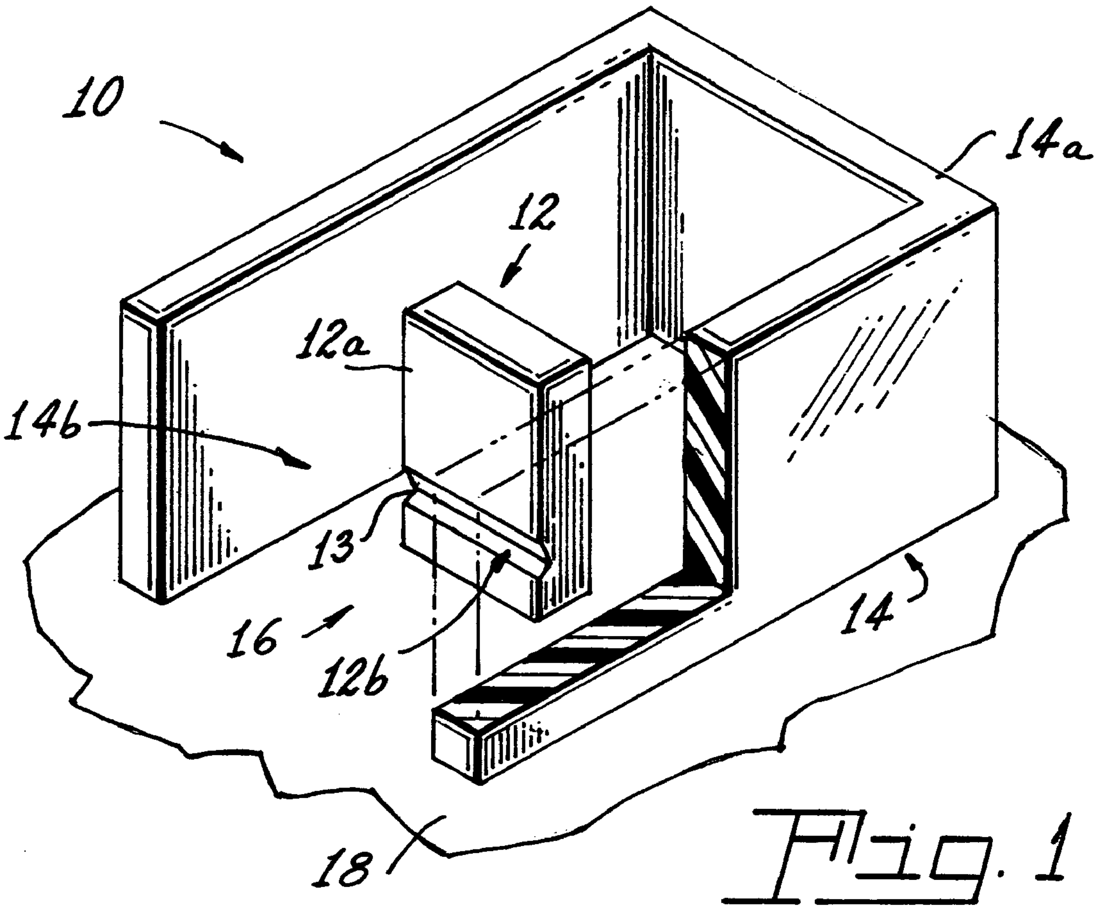
FIG. 1 is a perspective view of an embodiment of the invention.

Referring now to the drawings with greater particularity, there is shown in FIG. 1 a detectable indicator 10 that comprises a deformable element 12, a safeguard 14 at least partially surrounding said deformable element 12 and an area 16 in the safeguard allowing access to the deformable element 12.

The deformable element 12 in FIG. 1 comprises a tab 12*a* attached to a body 18 by a one-way hinge 12*b*. The one-way hinge can be in the form of a triangular slot 13 formed partway through the tab 12*a*.

The safeguard 14 comprises a wall 14*a* up-standing from the body 18 and surrounding the deformable element 12 on three sides and providing an open side 14*b*, which open side 14*b* provides the area 16 that allows the access to the deformable element 12.

Figure 3:
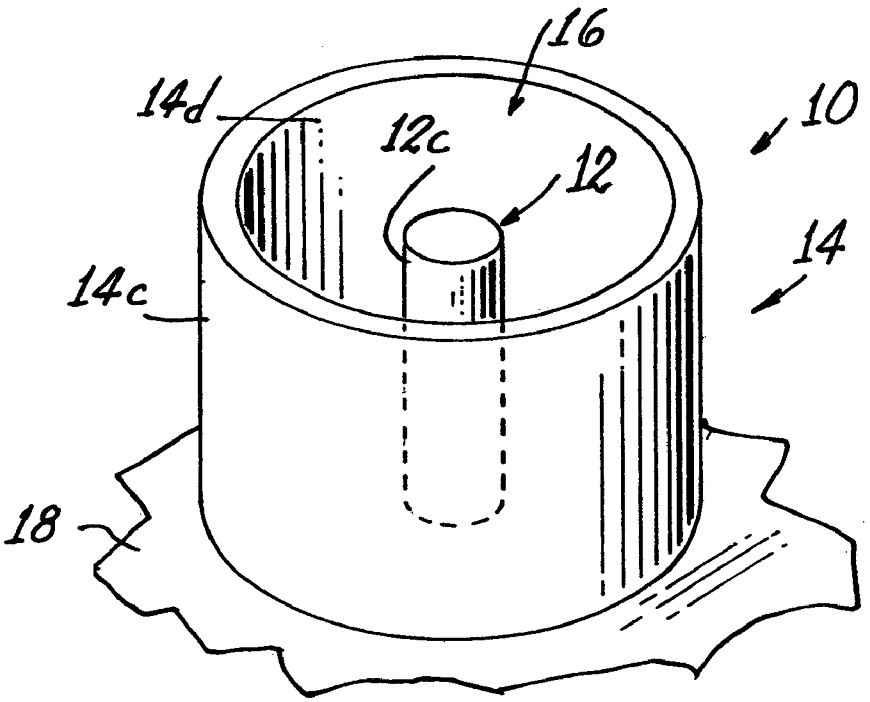
FIG. 3 is a perspective view of an alternate embodiment of the invention.
Figure 4:
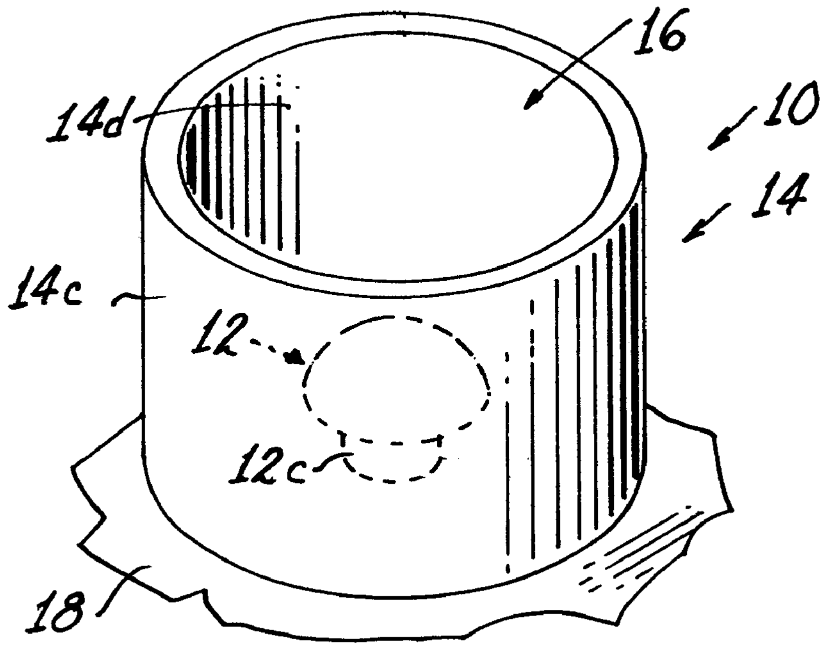
FIG. 4 is a similar view of the deformed indicator.

An alternate embodiment is shown in FIGS. 3 and 4 wherein the deformable element 12 comprises a heat-deformable rod 12*c*. The safeguard 14 in this instance comprises a circular wall 14*c* up-standing from the body 18 and surrounding the deformable rod 12*c* on all four sides. The area 16 that allows access to the deformable rod 12*c* comprises an open top 14*d* opposite the body 18.

The detectable indicators thus provided are completely protected during, for example, shipping operations; but are readily available for subsequent operations. After the sequence of operations that requires the indicator to be present, it can be deformed to eliminate it from further consideration.

Figure 2:
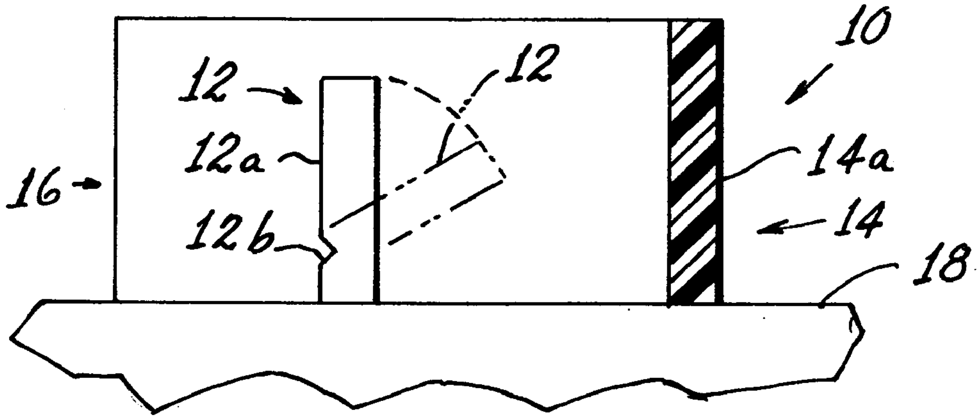
FIG. 2 is an elevational sectional view of the embodiment of FIG. 1 with a part in moved position.

In the embodiment of FIG. 1 this deformation can be accomplished by a tool that enters the area 16 and deforms the element 12 by bending it over, as shown in FIG. 2.

Likewise, the deformable rod 12*c* can be deformed into the "mushroom-shape" shown in FIG. 4 by engaging it with a heated tool that enters through the open end 14*d*.

After deformation the elements have performed their necessary function by insuring that subsequent operations are ready to be performed.

The solution is simple and inexpensive and, once provided in the original design of the part, has no further impact on the cost of the part. The safeguard protects the deformable element during shipping and operations that occur before the part is detected and yet allow its deformation once the part has been tested, verified or processed.

While there have been shown and described what are present considered to be the preferred embodiments of the invention, it will be apparent to those skilled in the art that various changes and modifications can be made herein without departing from the scope of the invention as defined by the appended claims.

What is claimed is:

1. A detectable indicator that is protected during pre-assembly operations comprising:

a mechanically deformable element having a first position at a first stage of said pre-assembly;

a fixed, immovable safeguard at least partially surrounding said deformable element; and an area in said safeguard allowing access to said deformable element for permanently moving said deformable element from said first position to a second position.

2. The detectable indicator of claim 1 wherein said deformable element comprises a tab attached to a body by a one-way hinge.

3. The detectable indicator of claim 2 wherein said safeguard comprises a wall up-standing from said body and surrounding said deformable element on three sides and providing an open side, said open side providing said area allowing said access to said deformable element.

4. The detectable indicator of claim 1 wherein said deformable element comprises a heat-deformable rod.

5. The detectable indicator of claim 4 wherein said safeguard comprises a circular wall up-standing from said body and surrounding said deformable element on four sides and said area allowing said access comprises an open top opposite said body.

* * * * *